UNITED STATES PATENT OFFICE.

WILLIAM ROY MITCHELL, OF NEW YORK, N. Y.

PROCESS FOR TREATING CRUCIBLES, &c.

No. 894,845.

Specification of Letters Patent.

Patented Aug. 4, 1908.

Application filed May 14, 1907. Serial No. 373,628.

*To all whom it may concern:*

Be it known that I, WILLIAM ROY MITCHELL, a citizen of the United States, residing at New York, in the county of New York and State of New York, have invented certain new and useful Improvements in Processes for Treating Crucibles, &c.; and I do hereby declare the following to be a full, clear, and exact description of the invention, such as will enable others skilled in the art to which it appertains to make and use the same.

My invention relates to a process for treating crucibles and other vessels to render them moisture-proof and therefore proof against scalping and cracking when heated whereby the life of each crucible or vessel, that is, the number of heatings it will stand, is increased from fifty to one hundred per cent.

Heretofore it has been necessary to subject all crucibles, pots, etc., to a slow heating process known as annealing in order to drive out the moisture that gathers and becomes absorbed in the walls thereof so that the high heating necessary to melt metals would not convert the moisture into steam which, expanding quickly, would crack or break the vessels and render them worthless. Unless vessels are kept in warm ovens away from dampness or moisture when not in use, this process of annealing must be repeated each time they are used.

The object of my present invention is to provide a crucible or other vessel which will be impervious to moisture and which will, therefore, not have to be kept in warm ovens or annealed every time it is to be used. In fact, crucibles after being treated with my process may be placed in water and immediately afterward plunged into a very high heat without injury.

The process or treatment to which I subject the crucibles or vessels consists in first heating them slowly and gradually bringing them to a high temperature. Then the vessels are filled or partly filled with copperas or ferrous sulfate and the high heat continued until the ferrous sulfate is absorbed by the walls of said vessels. When ferrous sulfate is heated, it first becomes a semi-liquid mass or paste. During the heating of this substance in a crucible, some of the pasty or watery mass is absorbed by the walls of the vessel while the remainder solidifies. That which is absorbed by the crucible closes up the pores in the walls so that moisture cannot enter, thereby preventing cracking and scalping and greatly increasing the life of the crucible. This process may be repeated as many times as may be necessary or desirable, it being understood that the oftener it is repeated the harder and more durable will the vessels become. Said vessels are then taken out of the fire and cooled, preferably by plunging them into water, but I do not wish to limit myself to cooling them in that way. The ferrous sulfate bath may be applied to the outside of the vessels by setting one inside of another with the same success.

It should be understood that my process may be employed in the treatment of all kinds and makes of crucibles no matter what their composition is, although those more generally used contain a mixture of graphite or clay. The process is also applicable to any form or shape of pots, bowls, jars, dippers, ladles or even graphite tubes or sticks and stirrers or anything made of a substance that is liable to crack or scalp on account of its containing moisture within itself when heat is applied.

If desired, the ferrous sulfate may be put in the crucible while the latter is cold and both be heated together until the ferrous sulfate is absorbed by the walls of the crucible.

I claim:—

1. A process of treating a vessel of the character described to render it moisture proof, which consists in heating ferrous sulfate therein until the pores in the walls thereof are closed to moisture.

2. A process of treating a vessel of the character described to render it moisture proof, which consists in first heating it and then treating it with ferrous sulfate.

3. A process of treating a vessel of the character described to render it moisture proof, which consists in first heating it, then treating it with ferrous sulfate and continuing the heating until the pores of the walls thereof are closed to moisture.

4. A process of treating a vessel of the character described to render it moisture proof, which consists in first heating it, then treating it with ferrous sulfate and continuing the heating until the pores of the walls thereof are closed to moisture and finally cooling said vessel.

5. A process of treating a vessel of the character described to render it moisture proof, which consists in first heating it to a high temperature, then treating it with ferrous sulfate and continuing the heating at a high temperature until the pores of the walls thereof are closed to moisture.

6. A process of treating a vessel of the character described to render it moisture proof which consists in first heating it slowly and gradually to a high temperature, then treating it with ferrous sulfate and continuing the heating until the pores of the walls of the vessel are closed to moisture.

7. A process of treating a vessel of the character described, to render it moisture proof, which consists in heating ferrous sulfate therein until said ferrous sulfate is reduced to a watery or pasty mass and enters and closes the pores of the walls of said vessel against moisture.

In testimony whereof, I affix my signature, in presence of two witnesses.

WILLIAM ROY MITCHELL.

Witnesses:
H. N. BAILEY,
E. E. ARCHER.